(12) United States Patent
Govek et al.

(10) Patent No.: US 12,514,703 B2
(45) Date of Patent: Jan. 6, 2026

(54) TAVR LOAD FORCE REDUCTION

(71) Applicant: St. Jude Medical, Cardiology Division, Inc., St. Paul, MN (US)

(72) Inventors: Tyler Govek, Minneapolis, MN (US); Michael Shane Morrissey, St. Paul, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 939 days.

(21) Appl. No.: 17/710,106

(22) Filed: Mar. 31, 2022

(65) Prior Publication Data

US 2022/0313435 A1     Oct. 6, 2022

Related U.S. Application Data

(60) Provisional application No. 63/168,457, filed on Mar. 31, 2021.

(51) Int. Cl.
*A61F 2/24*      (2006.01)
*A61F 2/95*      (2013.01)

(52) U.S. Cl.
CPC .......... *A61F 2/2436* (2013.01); *A61F 2/9517* (2020.05); *A61F 2/9525* (2020.05); *A61F 2220/0041* (2013.01); *A61F 2250/001* (2013.01); *A61F 2250/0039* (2013.01)

(58) Field of Classification Search
CPC .. A61F 2/9525; A61F 2250/0069; A61F 2/07; A61F 2/9517; A61F 2/2436; A61M 39/06; A61M 2025/0293; A61M 2025/1047; A61M 2039/0633; A61B 17/3462; A61B 10/0283; A61B 2017/2948; A61B 10/025; F16L 21/025

USPC ...................................... 604/167.06; 600/562
See application file for complete search history.

(56) References Cited

U.S. PATENT DOCUMENTS

| 2,995,388 A | * | 8/1961 | Morello, Jr. .......... F16L 19/086 |
| | | | 285/348 |
| 3,598,429 A | * | 8/1971 | Arnold .................. F16L 37/002 |
| | | | 285/342 |
| 5,626,599 A | * | 5/1997 | Bourne .............. A61B 17/0057 |
| | | | 606/157 |

(Continued)

FOREIGN PATENT DOCUMENTS

| CN | 101208046 A | * | 6/2006 | ........... A61B 10/025 |
| ES | 2601832 T3 | * | 2/2017 | ........... A61F 2/2418 |
| WO | WO-9922671 A2 | * | 5/1999 | ............. A61F 2/958 |

OTHER PUBLICATIONS

Translation of ES 2601832 (Year: 2017).*
Translation of CN 101208046 (Year: 2008).*

*Primary Examiner* — Brian E Pellegrino
(74) *Attorney, Agent, or Firm* — SLEMAN & LUND LLP

(57) ABSTRACT

A grip for inhibiting travel of a prosthetic valve loading tube along an outer shaft of a delivery catheter system has a lumen extending therethrough. A portion of the lumen has a variable internal diameter for selective frictional engagement with the outer shaft. In some arrangements, the variable internal diameter is provided by variable compression of a gasket aligned on the lumen. In other arrangements, the variable internal diameter is provided by a portion of the grip that surrounds the lumen and that has at least one circumferential gap of variable width.

11 Claims, 9 Drawing Sheets

(56) References Cited

U.S. PATENT DOCUMENTS

| | | | | |
|---|---|---|---|---|
| 5,843,046 A | * | 12/1998 | Motisi | A61B 5/150221 |
| | | | | 604/247 |
| 8,585,019 B2 | * | 11/2013 | Melsheimer | A61F 2/9526 |
| | | | | 254/134.3 R |
| 10,639,148 B2 | | 5/2020 | Braido et al. | |
| 2020/0397577 A1 | | 12/2020 | Alkhatib et al. | |

* cited by examiner

TAVR LOAD FORCE REDUCTION

CROSS-REFERENCE TO RELATED APPLICATION

The present application claims the benefit of the filing date of U.S. Provisional Patent Application No. 63/168,457 filed Mar. 31, 2021, the disclosure of which is hereby incorporated herein by reference BACKGROUND The present disclosure is directed to prosthetic heart valves, and more particularly, to devices that assist in loading prosthetic heart valves into a delivery device.

Heart failure is defined as the inability of the heart to pump enough blood to sustain normal bodily functions. Heart failure may be associated with a mechanical failure of a native valve. Such failures may arise because of congenital defects or as a result of age-related changes, infections, or other conditions.

Mechanical failures of the heart may result from a valve disorder. The heart has four valves: the tricuspid, pulmonary, mitral, and aortic valves. These valves have tissue leaflets that open and close with each heartbeat. The leaflets ensure proper blood flow through the four chambers of the heart and to the rest of the body. Heart valves sometimes exhibit the following types of disorders: regurgitation, stenosis, and atresia.

Regurgitation (backflow through or around a valve) often occurs when the valve does not close tightly enough, thereby resulting in blood leaking back into the chambers of the heart rather than flowing forward through the heart or into arteries. Regurgitation often occurs because of prolapse, i.e., when the cusps or leaflets of the valve bulge back into an upper heart chamber during diastole. Stenosis occurs when the cusps or leaflets of a valve stiffen or fuse together, such as from calcification, thereby preventing the valve from fully opening and inhibiting sufficient blood flow through the valve. Atresia occurs when a heart valve lacks an opening for blood to pass through.

Heart valve repair or replacement surgery restores or replaces a defective heart valve. The implantation of prosthetic cardiac valves has become increasingly common. One such procedure, known as Transcatheter Aortic Valve Implantation (TAVI) or Transcatheter Aortic Valve Replacement (TAVR), uses a prosthetic valve mounted on a stent that displaces the diseased native aortic valve. The prosthetic valve is delivered by compressing it to approximately the width of a pencil and introducing it through a variety of access approaches including a transfemoral, transapical, transaortic, subclavian, or radial approach. Using ultrasound and X-ray guidance, the device is positioned and deployed at the level of the native aortic annulus. As the device expands, it is anchored onto and displaces the diseased native valve to restore normal blood flow.

The replacement or repair of the aortic valve with a prosthetic device presents several challenges, including those associated with preparing the prosthetic device for delivery. Known delivery systems include numerous flexibly connected components and a lengthy catheter assembly. These components must be independently managed while the prosthetic device is forcibly compressed and driven into a sheath. To avoid introducing air into the patient, the prosthetic device must be loaded into the sheath within a sterile fluid, such as saline. The prosthetic device, sheath, and additional tools for loading the prosthetic device must therefore be held in a certain orientation throughout the loading process to prevent the fluid from spilling.

The foregoing factors typically necessitate the careful attention of multiple workers throughout the loading process. Any delay or error in the process will result in unnecessary expense and increased risk to the patient. Therefore, a continuing need exists for devices and methods that facilitate the efficient and reliable loading of a prosthetic device into a delivery system.

BRIEF SUMMARY

The present disclosure generally relates to grips that may be used during loading of a prosthetic valve into a delivery device. A grip may be a device having a lumen extending therethrough. The lumen may include a portion of variable diameter. The portion of variable diameter may be usable to frictionally engage a shaft received within the lumen and extending proximally from a sheath for retaining the collapsed prosthetic valve as it is guided to the corresponding native valve within the patient. The grip may be integrally formed with, or may have an external diameter greater than the internal diameter of, a loading tube that holds the sheath while the prosthetic valve is loaded. The grip may therefore impede proximal travel of the loading tube along the shaft.

The portion of the lumen through the grip having a variable diameter may be defined by a gasket. The gasket may be trapped within a case at an end of a fitting. The fitting may be movable along an axis along which the lumen extends. Movement of the fitting may affect a degree of axial compression of the gasket, which may be inversely correlated with the diameter of the portion of the lumen having a variable diameter. The fitting may be threadedly engaged with the case. Alternatively, the fitting may be resiliently biased against the gasket.

In other examples, the portion of the lumen through the grip having a variable diameter may be defined within a portion of the grip having at least one circumferential gap defined relative to the axis along which the lumen extends. The diameter of the portion of the lumen having a variable diameter may be varied by causing the width of the one or more circumferential gaps to vary. The circumferential gap may exist at the opening of a C-shape defined by an axial cross-section of a flexible portion of the grip. Alternatively, multiple circumferential gaps may be defined between multiple circumferentially distributed elements. The multiple circumferentially distributed elements may be movable radially inward or outward relative to the axis along which the lumen extends. The radial movability of the circumferentially distributed elements may be provided by flexible engagement of the elements to a fitting movably disposed within a case.

In another aspect, a grip for assembly to an outer shaft of a prosthetic valve delivery system may comprise a lumen extending through the grip and a deformable member that can be deformed to reduce a diameter of a variable diameter portion of the lumen.

In another aspect, a valve loading system may comprise any of the foregoing grips and a loading tube for receiving a prosthetic valve capsule, the loading tube having a proximal end defining a proximal opening having a proximal opening diameter that is greater than a smallest possible diameter of the variable diameter portion of the lumen.

In another aspect, a valve loading system may comprise a loading tube for receiving a prosthetic valve capsule, the loading tube having a proximal end defining a proximal opening having a proximal opening diameter, and a releasable grip, which may include a case having an external diameter greater than the proximal opening diameter, the case defining an internally threaded channel extending from a first end of the case, an aperture at a second end of the case opposite the first end of the case, and a space between the internally threaded channel and the aperture, a cannulated screw threadedly engaged with the internally threaded channel and having a head with an external diameter greater than a diameter of the internally threaded channel, the cannulation of the screw being aligned with the aperture, and an annular gasket trapped within the space, the gasket having a central opening aligned with the cannulation of the screw and the aperture such that the cannulation of the screw, the central opening, and the aperture collectively define a lumen extending through the grip.

In another aspect, a method of loading a prosthetic valve into a delivery system, and the method may comprise assembling a loading tube over a distal sheath and an outer shaft of the delivery system, the loading tube having a lumen with an internal diameter, tightening a grip on the outer shaft at a location corresponding to an intended limit of proximal travel for the loading tube along the outer shaft, the grip having an external diameter greater than the internal diameter of the loading tube, applying tension to an inner shaft extending within the outer shaft and the sheath and connected to the prosthetic valve while the prosthetic valve is disposed at a distal end of the loading tub.

BRIEF DESCRIPTION OF THE DRAWINGS

Various embodiments of the present disclosure are described herein with reference to the drawings, wherein.

DETAILED DESCRIPTION

As used herein in connection with a prosthetic heart valve, the term "inflow end" refers to the end of the heart valve through which blood enters when the heart valve is functioning as intended, and the term "outflow end" refers to the end of the heart valve through which blood exits when the heart valve is functioning as intended. As used herein in connection with a prosthetic heart valve, the term "proximal" refers to the inflow end of the heart valve or to elements of the heart valve that are relatively close to the inflow end, and the term "distal" refers to the outflow end of the heart valve or to elements of the heart valve that are relatively close to the outflow end. When used in connection with devices for delivering a prosthetic heart valve into a patient, the terms "proximal" and "distal" are to be taken as relative to the user of the delivery devices. "Proximal" is to be understood as relatively close to the user, and "distal" is to be understood as relatively farther away from the user. As used herein, the terms "substantially," "generally," "approximately," and "about" are intended to mean that slight deviations from absolute are included within the scope of the term so modified. Although the various features of the prosthetic heart valve recited herein are described in connection with a valve for replacing the function of a native aortic valve, it will be appreciated that the various loading apparatus described herein may also be used in conjunction with prosthetic valves for replacing the function of other cardiac valves, including the mitral valve, tricuspid valve, and pulmonary valve.

The present disclosure relates to aspects of delivery systems that may be generally similar to, with features of the present disclosure being among some possible exceptions, those described in U.S. Pat. No. 10,441,418 or U.S. Patent Pub. No. US2020/0397577, the entire disclosures of which are hereby incorporated by reference herein. The prosthetic valve delivered by these systems may be generally similar to, with distinctions mentioned in the present disclosure being among some possible exceptions, those described in U.S. Pat. No. 10,639,148 B2 or U.S. Pat. No. 9,039,759, the entire disclosures of which are hereby incorporated by reference herein.

Figure 1A:
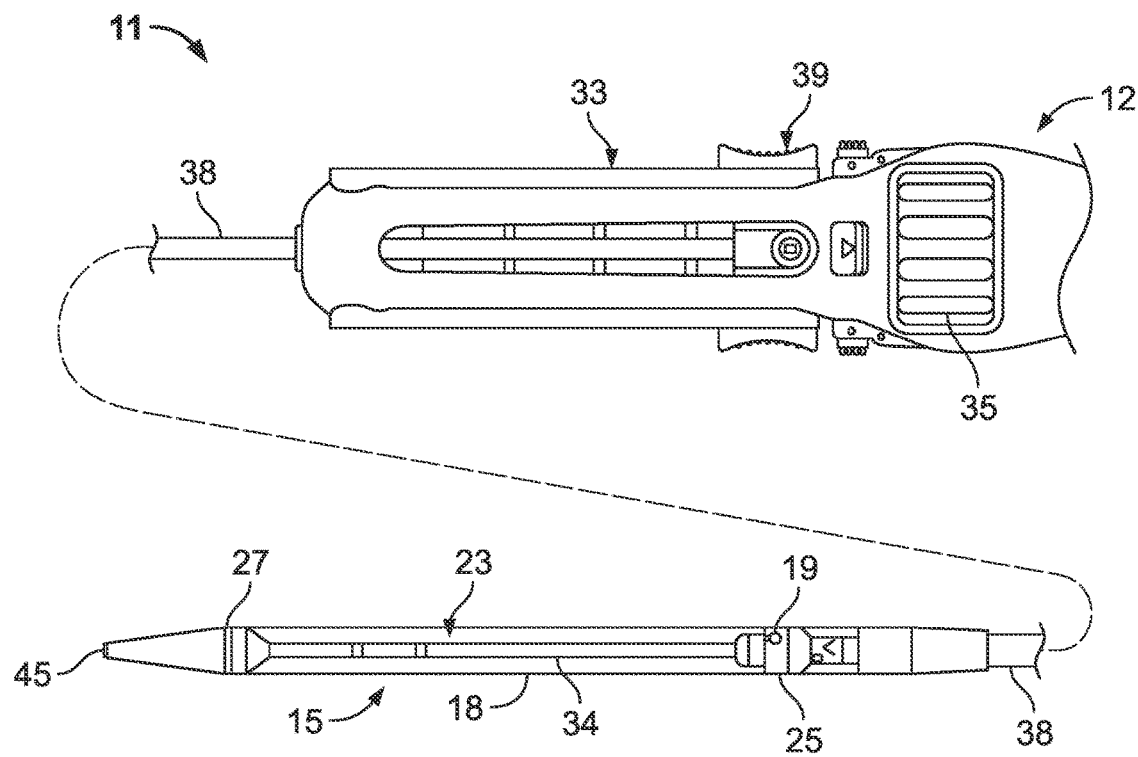
FIG. 1A is a top plan view of a portion of an operating handle for a delivery device, shown with a partial longitudinal cross-section of the distal portion of a transfemoral catheter assembly.
Figure 1B:
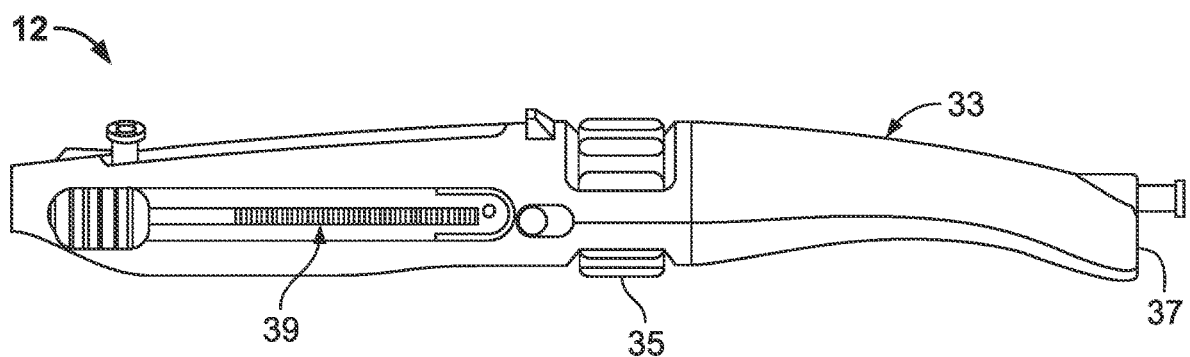
FIG. 1B is a side view of the handle of FIG. 1A.

FIGS. 1A and 1B show a prosthetic heart valve delivery device 11. Generally, delivery device 11 includes an operating handle 12 coupled to an outer catheter shaft 38. The delivery device 11 may also include a distal sheath 18 for holding a prosthetic heart valve therein. Delivery device 11 includes catheter assembly 15 for delivering the heart valve to, and deploying the heart valve at, a target location, and operating handle 12 for controlling deployment of the valve from the catheter assembly. Delivery device 11 extends from proximal end 37 (FIG. 1B) to nosecone 45, which provides an atraumatic tip at the distal end of catheter assembly 15. Catheter assembly 15 is adapted to receive a collapsible prosthetic heart valve (not shown) in compartment 23 defined around inner shaft 34 and covered by distal sheath 18.

Inner shaft 34 may extend through operating handle 12 to nosecone 45 of delivery device 11, and may include retainer 25 affixed thereto at a spaced distance from nosecone 45 and adapted to hold a collapsible prosthetic valve in compartment 23. Retainer 25 may have recesses 19 therein that are adapted to hold corresponding retention members of the valve.

Distal sheath 18 surrounds inner shaft 34 and is slidable relative to inner shaft 34 such that it can selectively cover or uncover compartment 23. Distal sheath 18 is affixed at its proximal end to outer shaft 38, the proximal end of which is connected to operating handle 12. The distal end 27 of distal sheath 18 abuts nosecone 45 when the distal sheath is fully covering compartment 23 and is spaced apart from the nosecone when compartment 23 is at least partially uncovered.

Operating handle 12 is adapted to control deployment of a prosthetic valve located in compartment 23 by permitting a user to selectively slide outer shaft 38 proximally or distally relative to inner shaft 34, thereby respectively uncovering or covering compartment 23 with distal sheath 18. The proximal end of inner shaft 34 may be connected in a substantially fixed relationship to outer housing 33 of operating handle 12, and the proximal end of outer shaft 38 may be affixed to carriage assembly 39 that is slidable along a longitudinal axis of the handle housing, such that a user can selectively slide outer shaft 38 relative to inner shaft 34 by sliding carriage assembly 39 relative to the handle housing. For example, a user may rotate deployment actuator 35 to move carriage assembly 39 proximally, thus moving outer shaft 38 and distal sheath 18 proximally to uncover a prosthetic heart valve positioned within compartment 23 in the collapsed condition. As distal sheath 18 begins to clear the prosthetic heart valve, the prosthetic heart valve begins to expand to an expanded condition so that it may be fixed within the native heart valve annulus of interest.

Figure 2:
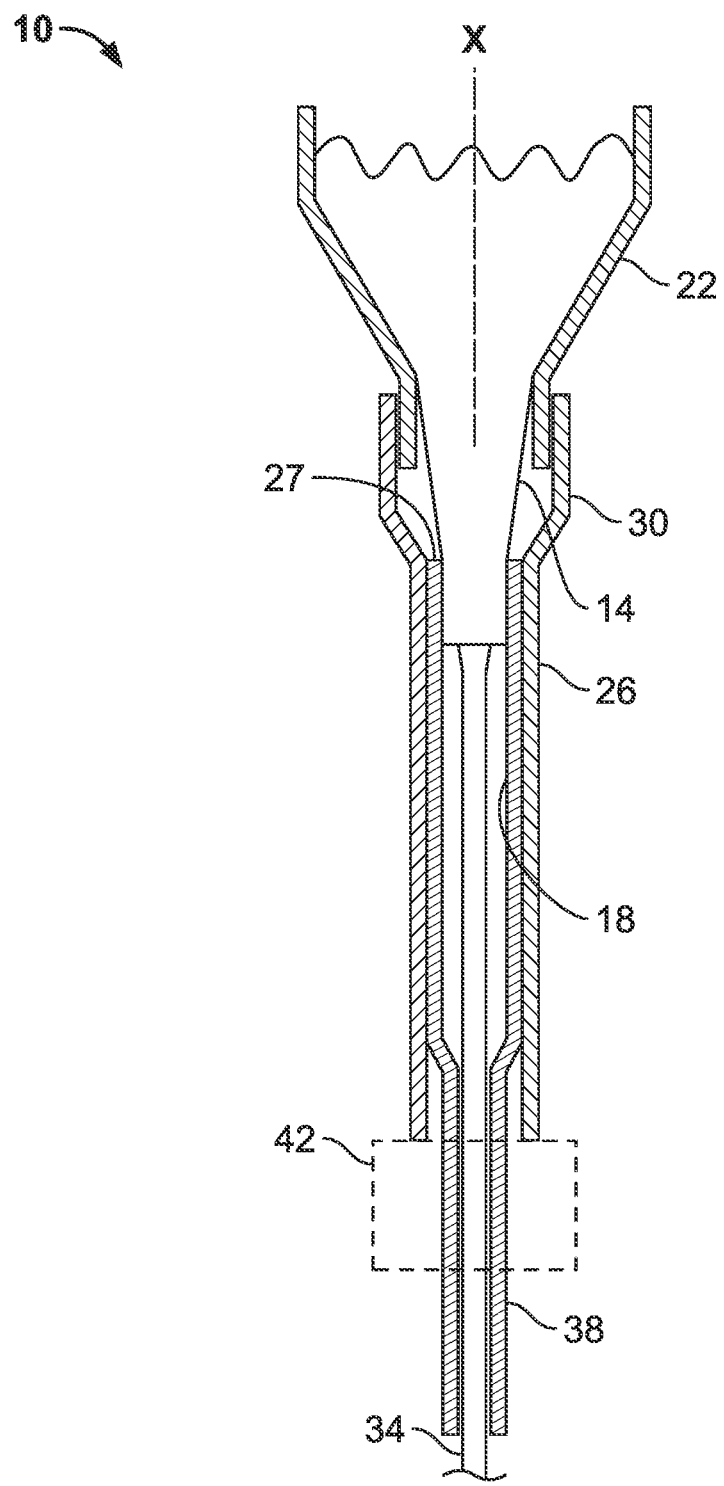
FIG. 2 is a longitudinal cross-sectional view of a portion of the capsule assembly of FIG. 1A with associated apparatus, including a grip, for loading a prosthetic valve into the delivery device.

Turning to FIG. 2, a loading assembly 10 is illustrated as applied to portions of a system such as that illustrated in FIGS. 1A and 1B. Loading assembly 10 includes a funnel 22, loading tube 26, and a releasable grip 42. Loading assembly 10 is aligned with sheath 18 along loading axis X to enable a user to draw a prosthetic valve 14 into the sheath.

Loading tube 26 fits closely around sheath 18 to provide a user with something to grasp during loading and to hold a reservoir of neutral fluid, such as saline, around the distal end 27 of the sheath as prosthetic valve 14 is loaded, thus preventing the introduction of air bubbles into the sheath.

In the illustrated example, funnel 22 is seated in a bowl 30 at a distal end of loading tube 26 such that the wider opening of the funnel faces distally, and the narrow end of the funnel faces proximally, toward the distal end 27 of sheath 18. However, in other arrangements, funnel 22 may be integrally formed with loading tube 26. Regardless, tension applied to inner shaft 34 to draw prosthetic valve 14 proximally into sheath 18 causes the prosthetic valve to bear against distally facing surfaces within funnel 22. Prosthetic valve 14 thus applies force in the proximal direction to funnel 22 as the prosthetic valve 14 is loaded, and the funnel transfers the proximal force to loading tube 26. Such proximal force can drive loading tube 26 proximally relative to sheath 18 and outer shaft 38.

Distal force must therefore be applied to loading tube 26 to prevent loading tube 26 from travelling proximally along sheath 18 and outer shaft 38. Such distal force can be applied by hand, by the user. However, use of a grip 42 on outer shaft 38 at the proximal end of loading tube 26 can reduce or remove the need to manually apply force in the distal direction on the loading tube 26.

Grip 42 engages outer sheath 38 and either abuts or is integrally formed with loading tube 26. Grip 42 thus responds to a proximal force applied to loading tube 26 during loading of prosthetic valve 14 with a proportional distal force upon the loading tube up to a maximum magnitude dictated by the engagement of the grip on outer shaft 38.

Grip 42 may be any device suitable for releasably engaging outer shaft 38. Grip 42 may be, for example, a device defining an opening therethrough, the opening having a variable size. Some examples of openings with a variable size may be defined by an elastic object that can expand or contract, by multiple objects that can be moved nearer or farther from one another, or by a single object that can be contracted or expanded. Because outer shaft 38 of most known delivery systems is generally cylindrical, grip 42 in many arrangements defines a circular or generally circular opening having a variable diameter, though openings of other shapes are contemplated.

Figure 3A:
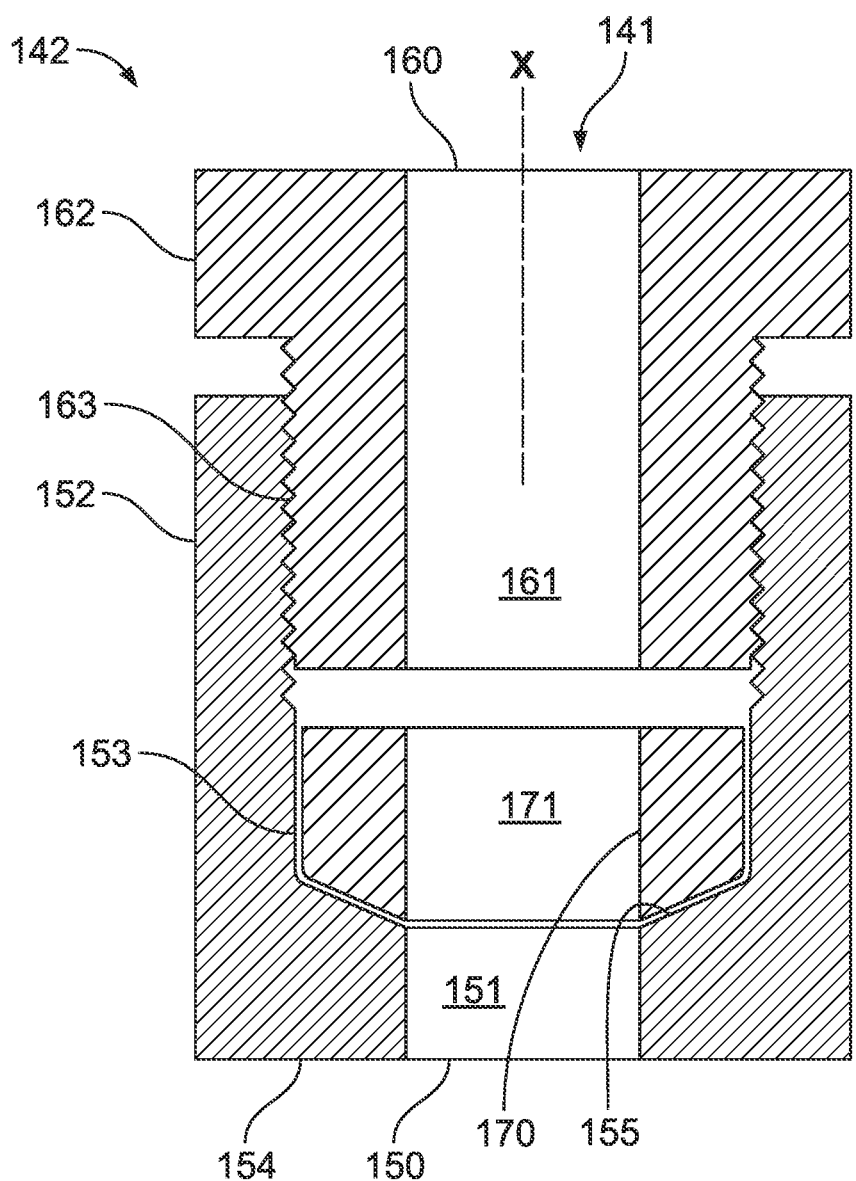
FIG. 3A is a longitudinal cross-sectional view of a grip according to an arrangement.
Figure 3B:
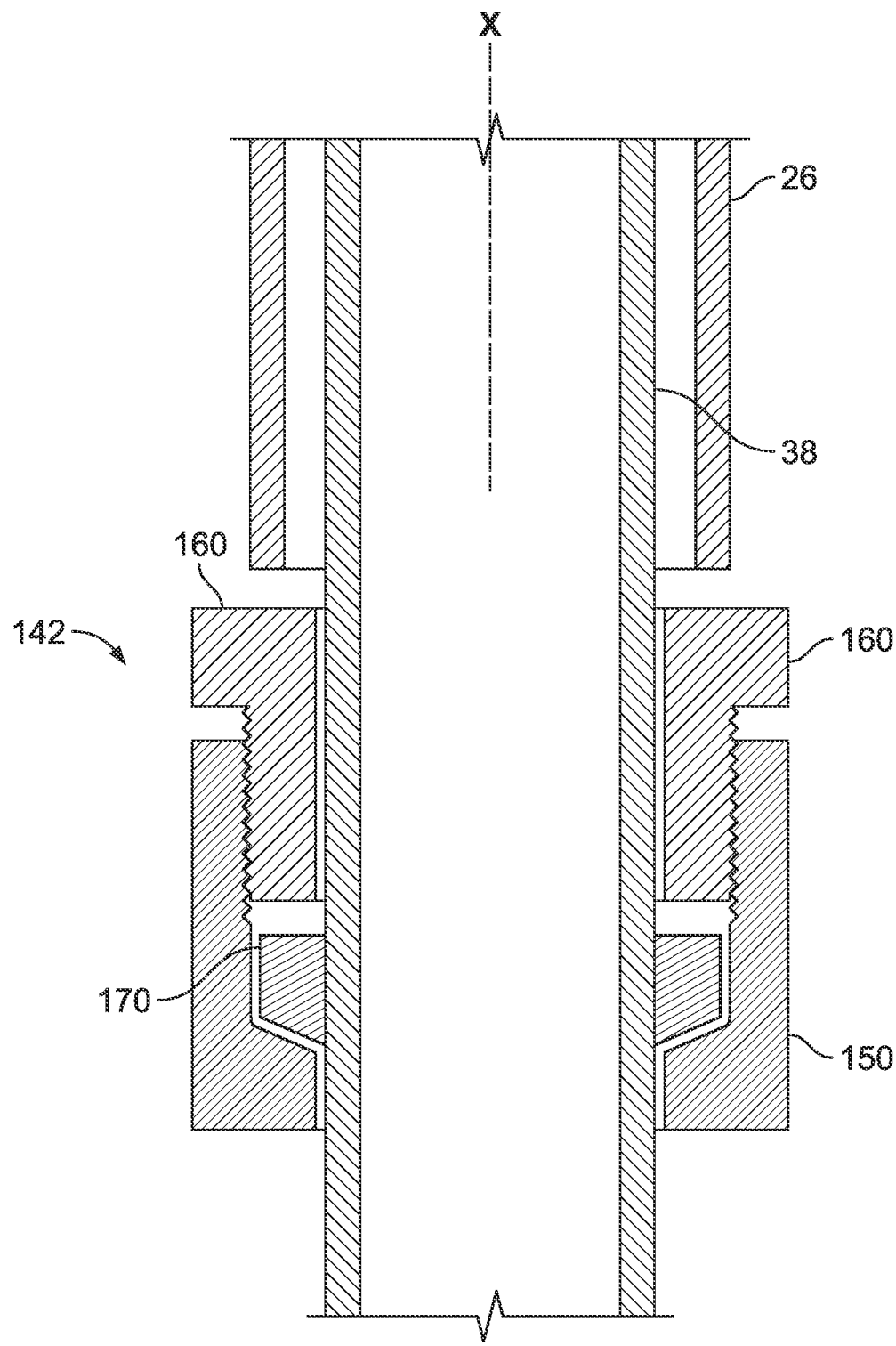
FIG. 3B is a longitudinal cross-sectional view of the grip of FIG. 3A applied to a portion of the catheter assembly of FIG. 1A.

FIGS. 3A and 3B illustrate a grip 142 having a Tuohy-Borst structure. Grip 142 includes a case 150 defining a cavity with a fitting 160 received therein. An annular gasket 170 of elastically deformable material, such as, for example, any type of natural or synthetic rubber, or any other material having generally similar mechanical properties, is trapped within case 150 at an end of fitting 160. Case 150 defines an aperture 151, fitting 160 defines a fitting lumen 161, and gasket 170 defines a gasket lumen 171, and the aperture, fitting lumen, and gasket lumen are aligned along loading axis X, which extends in a longitudinal direction. Aperture 151, fitting lumen 161, and gasket lumen 171 collectively define an opening or lumen 141 through grip 142 through which outer shaft 38 may extend.

Fitting 160 may be moved along loading axis X within case 150 to vary the axial compression of gasket 170 relative to loading axis X. As gasket 170 is compressed axially relative to loading axis X, the gasket will elastically deform so as to cause gasket lumen 171 to contract. Contraction of gasket lumen 171 is a reduction of the interior diameter of gasket 170, which is defined perpendicular to loading axis X. Travel of fitting 160 along loading axis X therefore causes the interior diameter at a point along the lumen 141 extending through grip 142 to vary. Movement of fitting 160 relative to case 150 may therefore be used to vary a contraction force providing frictional engagement of grip 142 with outer sheath 38.

The foregoing description applies generically to a variety of Tuohy-Borst structures that may be employed to form a grip 42 according to the present disclosure. Grip 142 is illustrated with a number of more specific details, and therefore represents one example implementation of a Tuohy-Borst structure in a suitable grip, though Tuohy-Borst grips that differ in such details may be constructed according to the present disclosure.

As illustrated in FIGS. 3A and 3B, fitting 160 is a cannulated screw threadedly received in case 150, though in alternative arrangements the fitting may be replaced with another type of fitting, fastener, or post with an axial location adjustable by features other than threaded engagement with the case. Fitting 160 includes a head 162 at one end serving to define a limit on how far the fitting can travel into case 150. Extending from head 162 is a relatively narrow, generally cylindrical externally threaded shaft 163 threadedly engaging the threads of an interiorly threaded portion 152 of case 150. Because of this threaded engagement, rotation of fitting 160 within case 150, which may, for example, be achieved by manually turning head 162 relative to the case, will cause the fitting 160 to travel along the loading axis X relative to the case.

Adjacent to interiorly threaded portion 152 is a space 153 in which gasket 170 is seated. An annular interior flange 154 bounds space 153 on an opposite side of the space from internally threaded portion 152 and defines the aperture 151.

Gasket 170 has an external diameter exceeding internal diameters of fitting lumen 161 and aperture 151, so the gasket is effectively trapped between interior flange 154 and an end of fitting 160 opposite from head 162. Travel of fitting 160 along loading axis X relative to case 150 varies the axial distance between interior flange 154 and the end of fitting 160 opposite from head 162. Gasket 170 will be compressed against an inner face 155 of interior flange 154 to a degree inversely proportional to such axial distance. As shown in FIG. 3A, inner face 155 of interior flange 154 is oriented at an acute angle to loading axis X, i.e., the longitudinal direction, and the surface of gasket 170 confronting the inner face 155 of interior flange 154 is oriented at an oblique angle to the longitudinal direction. As shown, the surface of gasket 170 confronting interior flange 154 may be oriented at about the same angle to the longitudinal direction as inner face 155. The interior diameter of space 153 limits outward expansion of gasket 170, so the gasket is forced to deform radially inward relative to loading axis X as fitting 160 travels nearer to interior flange 154, thus constricting gasket lumen 171 to a smaller diameter. Such constriction may be reversed by turning fitting 160 in an opposite direction relative to case 150, causing the fitting to travel away from interior flange 154 and allowing gasket 170 to return to a resting shape that defines a relatively large diameter for gasket lumen 171.

FIG. 3B illustrates one example orientation of grip 142 on outer shaft 38, but the grip may also be placed onto the outer shaft in an orientation that is inverted relative to the illustrated example. That is, in FIG. 3B, grip 142 is placed on outer shaft 38 such that the head 162 of fitting 160 faces the proximal end of loading tube 26. However, grip 142 may be placed on outer shaft 38 such that case 150 faces the proximal end of loading tube 26, while the head 162 of fitting 160 faces proximally. In either case, grip 142 has an overall external diameter defined perpendicular to loading axis X at least one location that exceeds the internal diameter of loading tube 26. As a result, if loading tube 26 is forced proximally relative to outer shaft 38, the proximal end of the loading tube will abut grip 142. Grip 142 will thus resist proximal travel of loading tube 26 relative to outer shaft 38 with a force having a maximum magnitude dictated by the magnitude of the frictional engagement of gasket 170 with the outer shaft. The magnitude of the frictional engagement between gasket 170 and outer shaft 38 is itself a function of the position of fitting 160 within case 150 and the degree of compression of gasket 170, and can therefore be adjusted by rotating the fitting within the case to compress the gasket axially, causing the annulus of the gasket to constrict onto the outer shaft.

Figure 4:
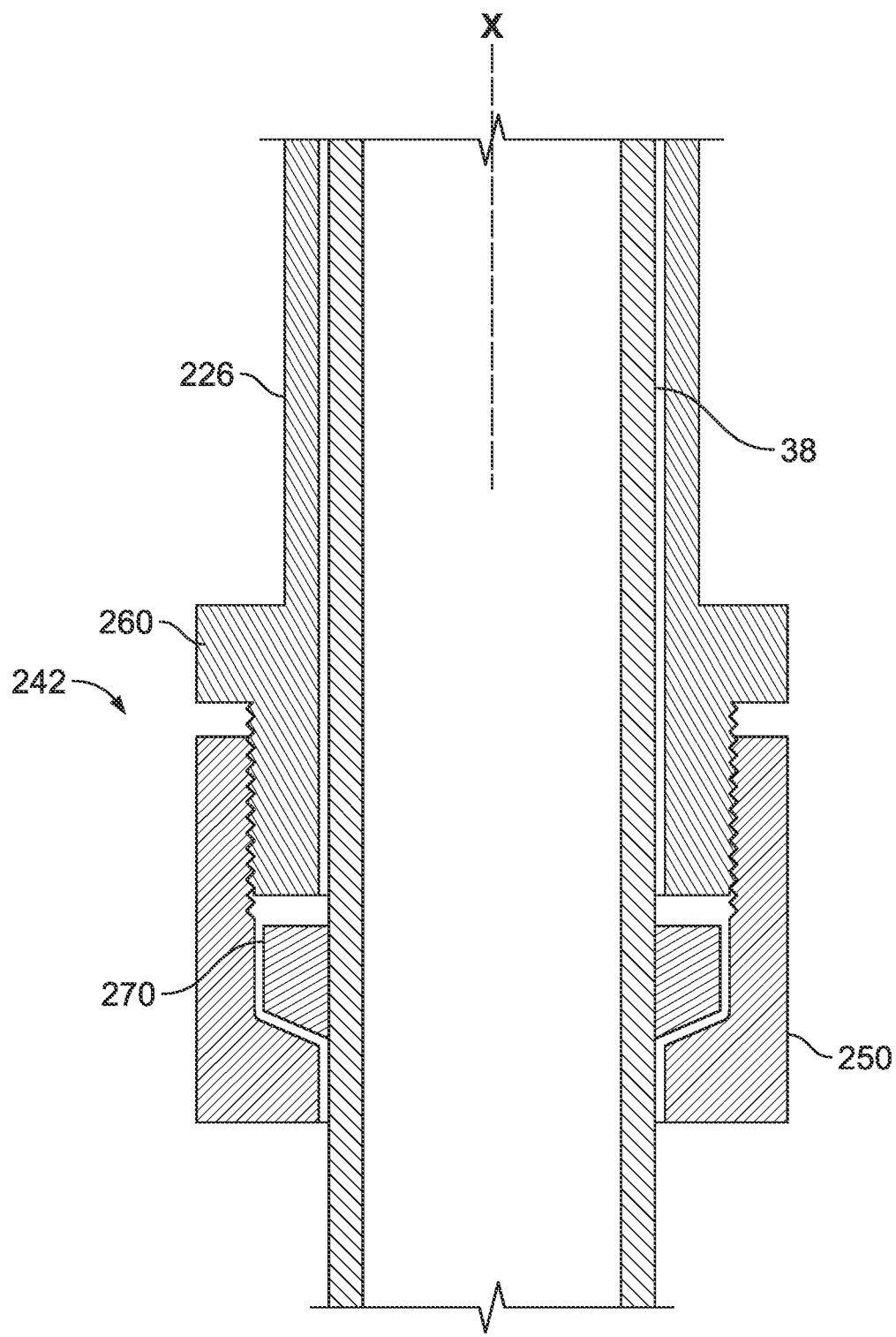
FIG. 4 is a longitudinal cross-sectional view of a grip according to another arrangement applied to a portion of the catheter assembly of FIG. 1A.
Figure 5:
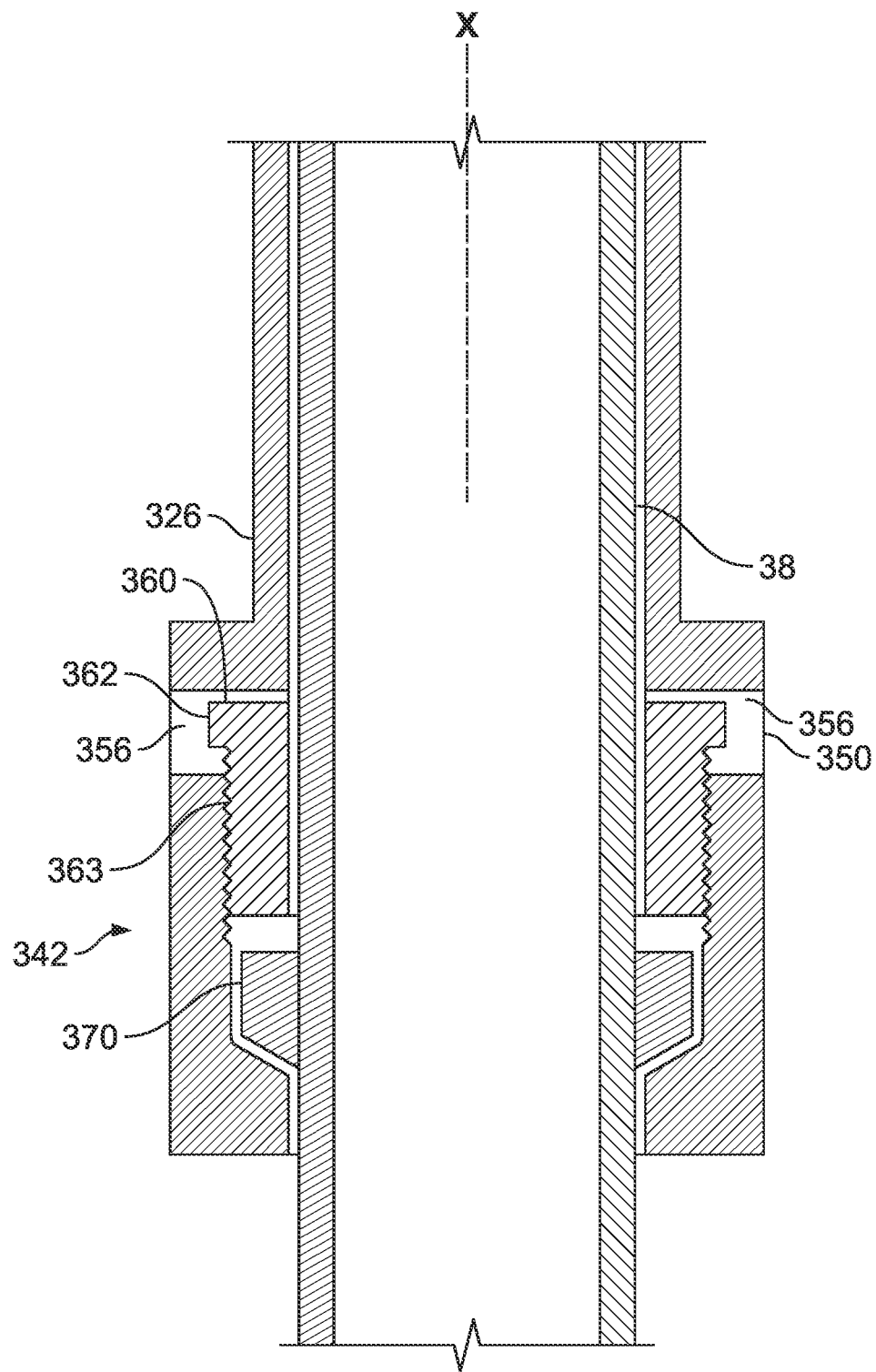
FIG. 5 is a longitudinal cross-sectional view of a grip according to another arrangement applied to a portion of the catheter assembly of FIG. 1A.

As noted above, grip 42 may be integrally formed with loading tube 26. Two such examples are illustrated in FIGS. 4 and 5, with like numerals referring to like elements (i.e., gaskets 170, 270, and 370 are generally alike). Elements shown in FIGS. 4 and 5 may therefore be assumed to have the same properties as those described above with regard to like numbered elements shown in any of the foregoing figures, except where specifically stated or shown otherwise.

FIG. 4 illustrates a grip 242 wherein a fitting 260 is integrally formed with a loading tube 226. Compression of gasket 270 and the frictional engagement with outer shaft 38 may therefore be varied by rotating case 250 about loading axis X relative to loading tube 226 and fitting 260.

In a variation on the arrangement of FIG. 4, the grip may be inverted such that the fitting is on the opposite side of the grip from the loading tube. In this variation, the case provides the distal end of the grip and is integrally formed with the loading tube, while the fitting is separate.

FIG. 5 illustrates a grip 342 wherein a case 350 provides the distal end of the grip and is integrally formed with a loading tube 326. At least one location, case 350 only partially surrounds fitting 360. At such location, case 350 includes a slot 356 extending around a portion of head 362 to provide access to fitting 360. In the illustrated example, slot 356 extends 180° about loading axis X, and thus exposes half of head 362, though the slot may be wider or narrower in other examples. However, in other examples, multiple separated slots 356 may exist, such as, for example, two slots on opposite sides of case 350, each exposing a different portion of head 362. Head 362 may therefore be accessed through slot 356 to turn fitting 360, which is advanced by external threading of boss 363, to compress or release gasket 370.

In a variation on the arrangement of FIG. 5, fitting 360 may be replaced by an internally threaded ring trapped within a slot, similar to slot 356, and an externally threaded column aligned on loading axis X and threadedly engaged with the ring. In this alternative, the column would be constrained against rotating within the case, such as by a spline engagement with the case at an unthreaded region of the column, and the case would include enough interior space to permit axial travel of the column Turning the ring in such an arrangement would cause the column to travel within the case to compress a gasket to varying degrees in a manner similar to grip 342.

Figure 6:
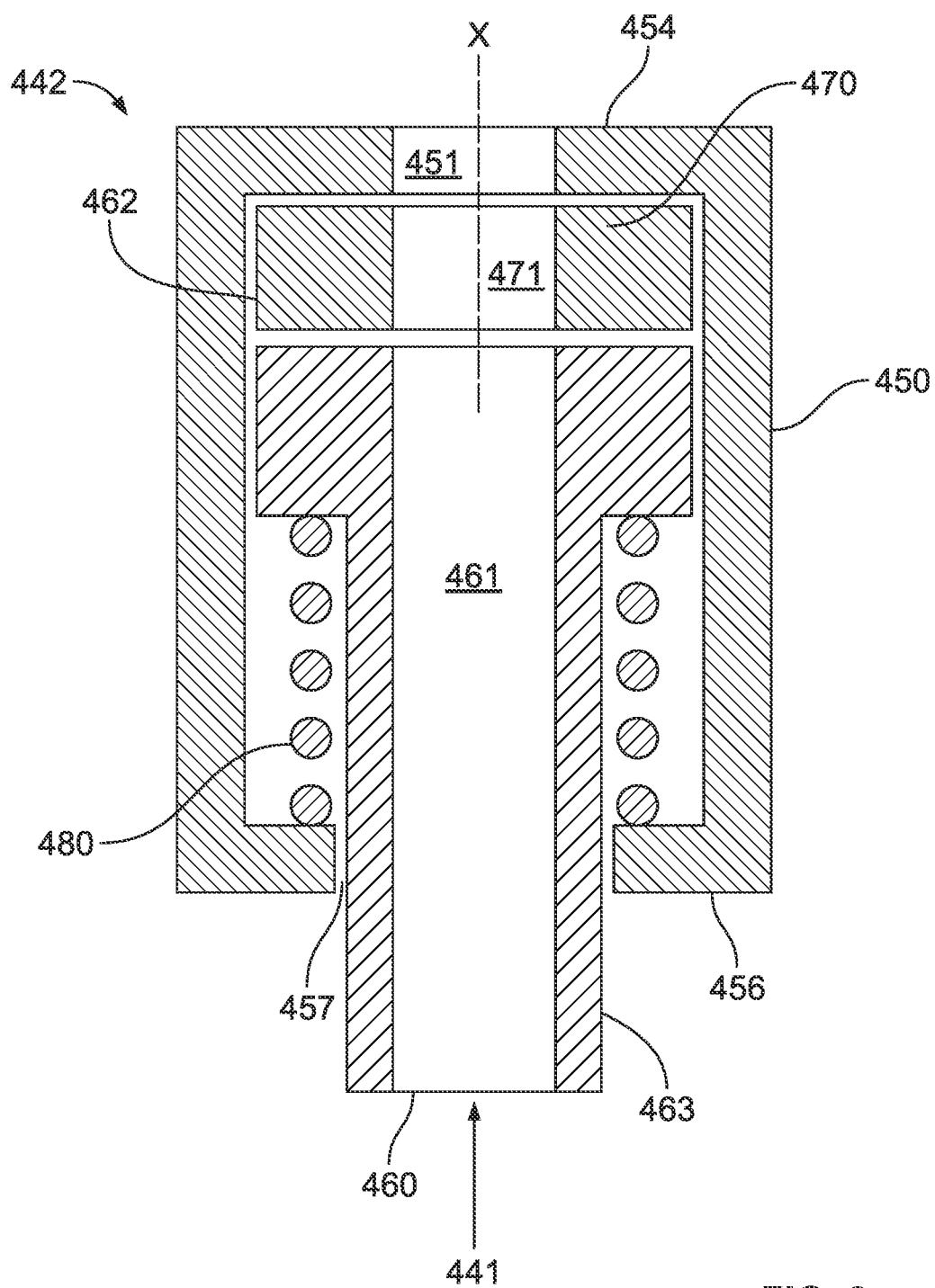
FIG. 6 is a longitudinal cross-sectional view of a grip according to another arrangement.

FIG. 6 illustrates a grip 442 according to another arrangement. Similar to the arrangements of FIGS. 3A-5, grip 442 includes a case 450, fitting 460, and annular gasket 470 defining, respectively, a aperture 451, fitting lumen 461, and gasket lumen 471. Aperture 451, fitting lumen 461, and gasket lumen 471 are aligned along loading axis X to collectively define an opening or lumen 441 extending along loading axis X entirely through grip 442 for receiving outer shaft 38.

Case 450 includes a first interior flange 454 at a first axial end of the case defining the diameter of aperture 451, and a second interior flange 456 at a second axial end of the case opposite the first axial end. Aperture 451 has a diameter less than the outer diameter of gasket 470, enabling the gasket to seat against first interior flange 454 while preventing the gasket from escaping case 450 through the aperture. Second interior flange 456 defines an opening 457 centered on loading axis X and having a larger diameter than aperture 451.

Fitting 460 includes a head 462 of greater diameter than opening 457 defined by second interior flange 456 and a cannulated boss 463 of relatively narrow diameter extending out of case 450 through the opening.

A cylindrical spring 480, such as, for example, a coil spring, or any other cylindrical biasing element, extends concentrically around boss 463 between second interior flange 456 and head 462. Spring 480 is seated at opposite ends on second interior flange 456 and head 462, respectively, and thus acts to bias fitting 460 toward first interior flange 454. Spring 480 thereby causes head 462 to compress gasket 470 against first interior flange 454 such that the diameter of gasket lumen 471 is reduced.

Spring 480 is trapped within grip 442, and case 450 more specifically, in such a configuration that gasket 470 is compressed unless fitting 460 is pulled away from the gasket in opposition to the spring force. The resilience of spring 480 is balanced against a resilience of gasket 470 such that gasket lumen 471 will have a smaller diameter than the narrowest points of aperture 451 and fitting lumen 461 when no external force is applied to pull fitting 460 away from the gasket in opposition to the spring force. That is, absent an insufficient spring force, an external force pulling head 462 away from first interior flange 454 or any object preventing constriction of gasket lumen 471, the gasket lumen forms the narrowest point of the lumen 441 defined collectively by the gasket lumen, aperture 451, and fitting lumen 461. Gasket 470 will therefore frictionally engage any generally cylindrical object having a greater diameter than the constricted gasket lumen 471, such as outer shaft 38, if such object is disposed within the lumen 441 of grip 442. Such frictional engagement may be varied by pulling head 462 away from first interior flange 454, such as, for example, by grasping case 450 and boss 463 and pulling them in opposite directions to further compress spring 480. While compressing spring 480, retraction of head 462 away from first interior flange 454 will reduce the axial compression of gasket 470 and allow gasket lumen 471 to expand, thereby reducing or entirely releasing the frictional engagement of the gasket upon the gripped object.

Much like grip 142, grip 442 may be applied to outer shaft 38 in either of two orientations. Both the first axial end and the second axial end of case 450 are greater in diameter than the opening at the proximal end of loading tube 26, so the proximal end of the loading tube will abut case 450 if forced proximally along outer shaft 38 regardless of the orientation of grip 442. Upon such abutment, the frictional engagement of gasket 470 with outer shaft 38 will resist further proximal travel of loading tube 26.

In variations of grip 442 from the illustrated arrangement thereof, case 450 may be integrally formed with loading tube 26 with either the first axial end or the second axial end of the case facing proximally. Alternatively, a portion of boss 463 extending distally from case 450 may be integrally formed with loading tube 26, while case 450 remains separately formed.

Figure 7:
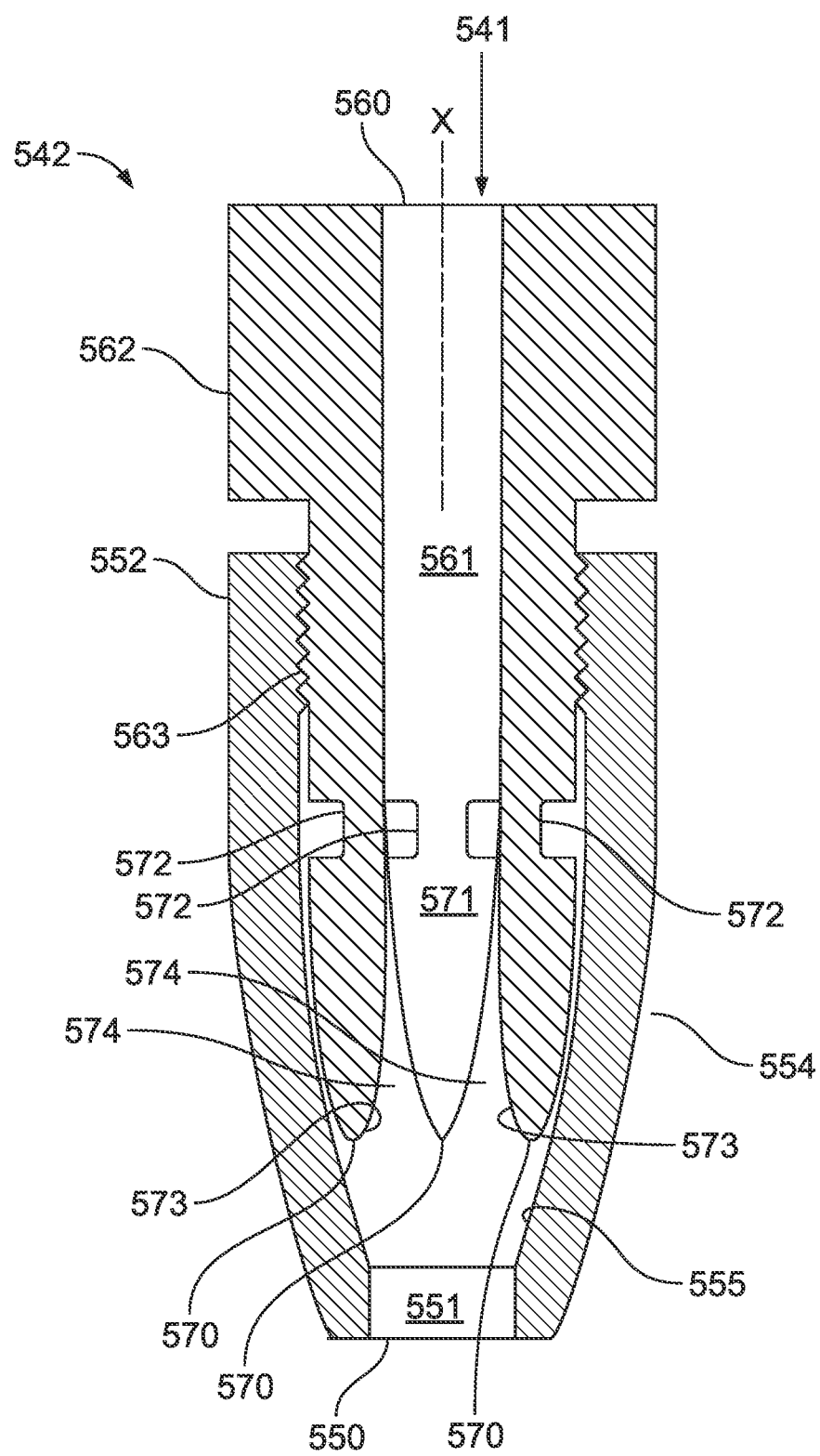
FIG. 7 is a longitudinal cross-sectional view of a grip according to another arrangement.

FIG. 7 illustrates a grip 542 according to another arrangement. Grip 542 includes a case 550 defining cavity tapering from a wide end to a narrow end that defines a aperture 551. Disposed within case 550 is a fitting 560. According to the illustrated example, fitting 560 includes a head 562 of relatively wide diameter that acts to limit the distance which the fitting may travel into case 550, but fittings according to other arrangements may lack such a head.

Fitting 560 is adjustably disposed within the cavity defined within case 550, meaning that the fitting can be moved among various stable positions within the case. Such adjustability can be provided by a variety of mechanisms, but in the illustrated example fitting 560 is generally a cannulated screw threadedly engaged within case 550. An externally threaded boss 563 extends from head 562 into case 550 and is in threaded engagement with an internally threaded portion 552 of the case. The position of fitting 560 within case 550 is therefore adjustable by rotating the fitting within the case about loading axis X. However, in alternative arrangements boss 563 may be unthreaded, and fitting 560 may instead be spring biased toward aperture 551 in a manner similar to the bias of fitting 460 toward aperture 451 as shown in FIG. 6.

Flexible fingers 570 extend toward aperture 551 from an end of boss 563 opposite head 562. Though absent from certain alternative arrangements, in the illustrated example a neck 572 of lesser cross-sectional area than adjoining portions of fingers 570 flexibly joins each finger 570 to boss 563.

Fingers 570 may be provided in any plural number, with the three fingers in the illustrated arrangement being merely one example. Regardless of their quantity, fingers 570 are distributed circumferentially about loading axis X. A surrounded space 571 is therefore defined between fingers 570. Circumferential gaps 574 exist between fingers 570, meaning the fingers form only an incomplete ring, but surrounded space 571 is nonetheless generally circular in shape. Surrounded space 571 has a diameter defined perpendicular to, and centered on, or at least approximately centered on, loading axis X.

Because fingers 570 are themselves flexible or are flexibly connected to boss 563, the tapering shape of the cavity defined within case 550 will cause the fingers to converge inwardly as fitting 560 travels closer to aperture 551 and the fingers bear against surfaces defining the cavity. Thus, the diameter of the surrounded space 571 and the widths of circumferential gaps 574 decrease with increasing proximity of fitting 560 to aperture 551.

Surrounded space 571 is disposed between fitting lumen 561 and aperture 551. Aperture 551, fitting lumen 561, and surrounded space 571 are aligned along loading axis X to collectively define an opening or lumen 541 extending through grip 542. At some positions of fitting 560 within case 550, surrounded space 571 is the narrowest portion of lumen 541. Frictional engagement of grip 542 with an object, such as outer shaft 38, disposed through lumen 541 may therefore be achieved and varied in magnitude by moving fitting 560 along loading axis X within case 550.

Fingers 570 may be constructed so as to reduce any risk of damage to an outer surface of outer shaft 38 when grip 542 is engaged with the outer shaft. In the illustrated example, interior surfaces 573 of fingers 570 taper radially outward relative to loading axis X with increasing distance from fitting 560. Such outward tapering ensures that fingers 570 will contact outer shaft 38 tangentially with interior surfaces 573 rather than with pointed tips of the fingers, which might gouge the outer shaft.

Grip 542 may be placed on outer shaft 38 with either case 550 or fitting 560 facing loading tube 26. Case 550 has a greater diameter than the interior of loading tube 26, so the proximal end of the loading tube will inevitably abut grip 542 if the loading tube travels far enough proximally along outer shaft 38.

In a similar manner to that illustrated and described above with regard to other grips, either case 550 or fitting 560 may be integrally formed with loading tube 26 in alternative arrangements of grip 542.

The shapes and respective proportions of elements of grip 542 may vary from those illustrated. For example, in alternative arrangements, aperture 551 may be wide enough to permit fingers 570 to extend out of case 550 at certain positions of fitting 560 within the case. Fingers 570 and necks 572 may be made of any resiliently flexible material. Some examples include polymers, such as polyvinyl chloride, polyethylene, polypropylene, polyether ether ketone (PEEK), acrylomitrile butadiene styrene (ABS), polycarbonate, and silicone, any type of rubber, any resiliently flexible metals such as stainless steel, or any such metals or polymers coated or lined with silicone, rubber, or another pliable material. Materials with generally similar properties to any of the foregoing are also suitable.

Figure 8:
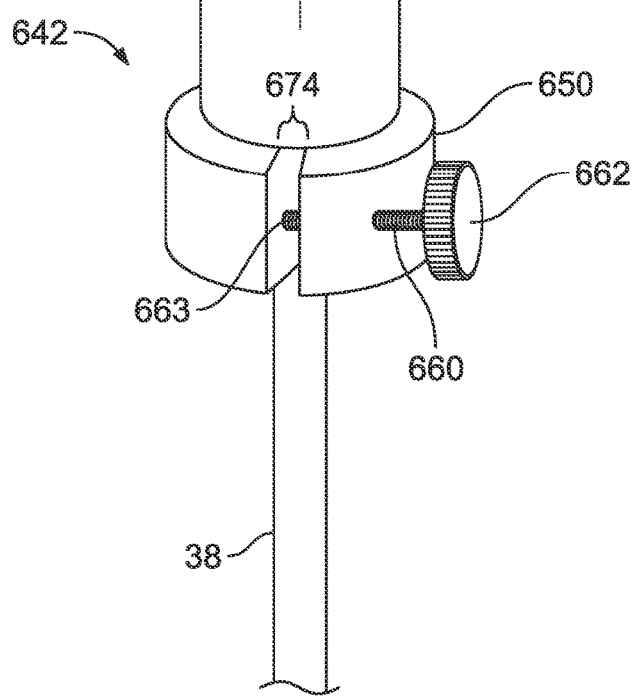
FIG. 8 is a perspective view of a grip according to another arrangement.

FIG. 8 illustrates a grip 642 according to another arrangement. Grip 642 includes a clamp 650 in the form of a ring with a circumferential gap 674 at one location. Clamp 650 may be elastically deformable, may have a hinge separating the clamp into two pivotable arcs, or both. The hinge, if included, is at a location angularly removed from circumferential gap 674, such as roughly or exactly opposite from the circumferential gap. Clamp 650 defines an interior lumen extending therethrough along loading axis X with a diameter that can be varied in proportion to the width of circumferential gap 674.

A screw 660 extends through clamp 650, traversing circumferential gap 674. Screw 660 has an externally threaded portion 663 that extends through a bore in clamp 650 on one side of circumferential gap 674, and is threadedly engaged with a threaded bore in the clamp on the other side of the circumferential gap. Turning screw 660 may therefore draw the opposed faces of circumferential gap 674 closer to one another to narrow the circumferential gap, thereby narrowing the internal diameter of grip 642. Turning screw 660 in the opposite direction will instead widen circumferential gap 674, thereby increasing the internal diameter of grip 642. Frictional engagement of grip 642 with outer shaft 38 may therefore be varied by turning screw 660. Screw 660 is provided with a flat or knurled head 662 to facilitate such turning.

Clamp 650 may be separate from loading tube 26. In such case, the proximal end of loading tube 26 will abut clamp 650 of grip 642 during proximal travel of the loading tube along outer shaft 38. Alternatively, clamp 650 may be connected at a circumferential location thereof to loading tube 26 or may be integrally formed therewith. In either case, grip 642 will inhibit proximal travel of loading tube 26 along outer shaft 38 when clamp 650 frictionally engages outer shaft 38.

Figure 9A:
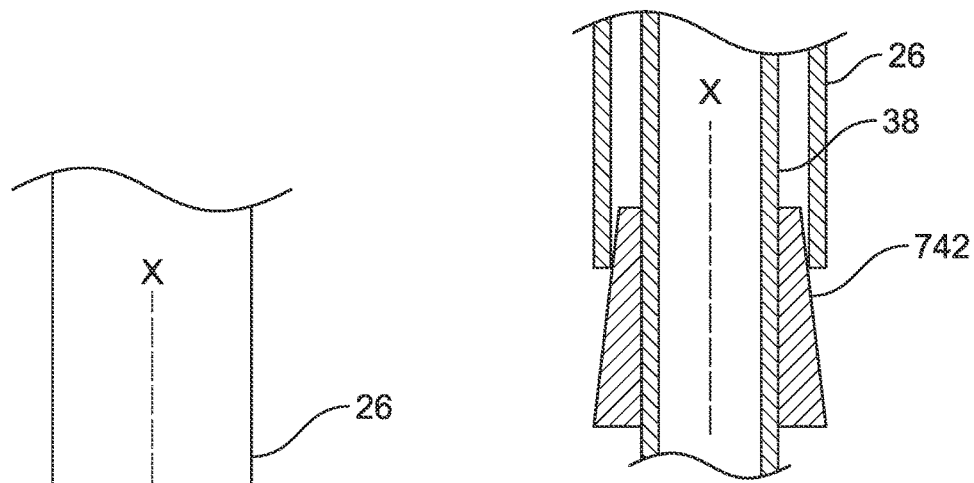
FIG. 9A is a longitudinal cross-sectional view of a grip according to another arrangement.
Figure 9B:
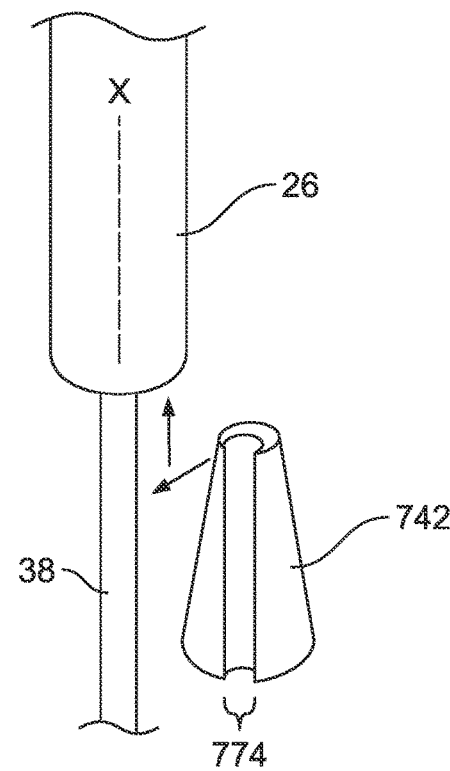
FIG. 9B illustrates a stage in a process of applying the grip of FIG. 9A to a portion of the catheter assembly of FIG. 1A.

FIGS. 9A and 9B illustrate a grip 742 according to another arrangement. Grip 742 is in the shape of a cannulated cone, or more specifically a cannulated conical frustum, which may be placed on outer shaft 38 in alignment along loading axis X.

At a wider end, grip 742 has an external diameter perpendicular to loading axis X that is greater than the internal diameter of loading tube 26, but the grip tapers to a narrow end having an external diameter that is less than the internal diameter of the loading tube. With the wider end of grip 742 directed proximally, the narrower end of the grip can fit into the proximal end of loading tube 26 as shown in FIG. 9A. Because the wider end of grip 742 has an external diameter that is greater than the internal diameter of loading tube 26, the frictional engagement of the grip on outer shaft 38 will increase with an increasing depth of insertion of the narrower end of the grip into the loading tube as such increasing depth of insertion causes radial compression of the grip. Grip 742 will therefore inhibit proximal travel of loading tube 26 along outer shaft 38.

Grip 742 may be made of any resiliently flexible material, such as rubber. A rubber grip 742 would frictionally engage an interior of loading tube 26 as well as an exterior of outer shaft 38. Any polymers or other materials with similar properties may be used instead of rubber. Suitable examples include silicone, ethylene propylene diene monomer (EDPM) rubber, polyurethane, and nitrile rubber.

Turning to FIG. 8B, the illustrated example of grip 742 includes a circumferential gap 774 wide enough to accept outer shaft 38 within an axial lumen defined within the grip, though in alternative arrangements the grip may lack such a gap and instead may be slid axially along the outer shaft. Such circumferential gap 774 will narrow slightly as the interior diameter of grip 742 decreases and frictional engagement of the grip with outer shaft 38 increases. A user may use circumferential gap 774 to place grip 742 onto outer shaft 38 and move the grip along loading axis X to an intended axial location for the proximal end of loading tube 26.

Grip 42, which may be any of the above-described grips 142, 242, 342, 442, 542, 642, or 742, may be employed to inhibit proximal travel of loading tube 26 along outer shaft 38 while prosthetic valve 14 is loaded into sheath 18.

Grip 42 may be placed on outer shaft 38 before or after loading tube 26 is placed over sheath 18. Grip 42 is then adjusted to a location along outer shaft 38 corresponding to a proximal limit of travel for the proximal end of loading tube 26. Grip 42 is tightened at this location to frictionally engage shaft 38.

Tightening grip 42 includes narrowing the diameter of a narrowest part of a lumen extending through the grip, and within which shaft 38 is received. Actions to tighten grip 42 depend on the grip's structure. Grip 742 may be tightened by advancing the narrow end of the grip into the proximal end of loading tube 26, or by drawing the proximal end of the loading tube proximally over the narrow end of the grip. For other arrangements, tightening grip 42 may be accomplished by causing a first component 160, 260, 360, 460, 560 of the grip to move along loading axis X relative to a second component 150, 250, 350, 450, 550 of the grip. First component 160, 260, 360, 560 may be advanced along loading axis X relative to second component 150, 250, 350, 550 by turning the first component about the loading axis within the second component to advance the first component along a threaded engagement with the second component. Advancement of first component 160, 260, 360, 460 may narrow the lumen extending through grip 42 by axially compressing, relative to loading axis X, a gasket 170, 270, 370, 470 defining a narrowest portion of the lumen extending through the grip. Alternatively, advancement of first component 560 may narrow the lumen extending through grip 42 by causing multiple fingers 570 surrounding a narrowest portion of the lumen extending through the grip to converge radially toward one another relative to loading axis X. Tightening of grip 42 may include narrowing one or more circumferential gaps 574, 674, 774 within the grip.

After placing and tightening grip 42, placing loading tube 26 over sheath 18, and aligning funnel 22 on loading axis X to hold prosthetic valve 14, proximal tension may be applied to inner shaft 34 to draw the prosthetic valve proximally against the funnel. During the application of proximal tension on inner shaft 34, grip 42 may inhibit proximal travel of funnel 22 and loading tube 26 along outer shaft 38. The user may also manually apply distal force to loading tube 26 while proximal tension is applied to inner shaft 34 to inhibit proximal travel of funnel 22 and loading tube 26 along outer shaft 38 in cooperation with grip 42. When the loading of prosthetic valve 14 is complete, loading tube 26 may be removed from sheath 18 and grip 42 may be removed from outer shaft 38.

To summarize the foregoing, disclosed is a grip for assembly to an outer shaft of a prosthetic valve delivery system, and the grip may comprise a lumen extending through the grip and a deformable member that can be deformed to reduce a diameter of a variable diameter portion of the lumen; and/or the grip may comprise a stationary component integrally connected to a loading tube for receiving a prosthetic valve capsule; and/or the grip may comprise a movable component that is movable relative to the stationary component along a loading axis along which the loading tube extends, and the diameter of the variable diameter portion changes in response to movement of the movable component within a range of positions relative to the stationary component; and/or the grip may comprise a first component and a second component relative to which the first component is movable, and the diameter of the variable diameter portion changes in response to movement of the first component within a range of positions relative to the second component; and/or the lumen may extend along a loading axis and the grip deformable member is an annular gasket centered upon the loading axis and defining the variable diameter portion, the gasket being disposed between opposed surfaces of the first component and the second component such that movement of the first component within the range of positions varies axial compression of the gasket with respect to the loading axis; and/or the first component may be a fitting, the second component is a case within which the fitting and the gasket are disposed, and the gasket is trapped within a space between the opposed surfaces of the first component and the second component; and/or the lumen may extend along a loading axis, and the deformable member is a plurality of flexible fingers extending axially with respect to the loading axis from the first component, and the second component defines a cavity within which the first component is disposed, the cavity tapering along the loading axis from a wider end to a narrower end such that movement of the first component within the range of positions causes the fingers to deflect radially inward with respect to the loading axis; and/or radially inner faces of the may fingers taper away from the loading axis with increasing distance from the first component; and/or the first component may be a screw threadedly engaged with the second component; and/or the first component may be spring biased relative to the second component to a position within the range of positions at which the variable diameter portion defines a narrowest portion of the lumen; and/or the second component may be a case, and a portion of the first component extends out of the case; and/or the deformable member may have a circumference and a gap in the circumference, the gap being of variable width; and/or the deformable portion may have a plurality of flexible elements distributed circumferentially about the variable diameter portion of the lumen, the gap being one of a plurality of gaps each defined between two of the fingers; and/or the deformable portion may be a clamp with a tightening screw extending across the gap; and/or the deformable portion may be a cannulated conical frustum.

Also disclosed is valve loading system which may comprise any of the foregoing grips and a loading tube for receiving a prosthetic valve capsule, the loading tube having a proximal end defining a proximal opening having a proximal opening diameter that is greater than a smallest possible diameter of the variable diameter portion of the lumen.

Also disclosed is a valve loading system which may comprise a loading tube for receiving a prosthetic valve capsule, the loading tube having a proximal end defining a proximal opening having a proximal opening diameter, and a releasable grip, which may include a case having an external diameter greater than the proximal opening diameter, the case defining an internally threaded channel extending from a first end of the case, an aperture at a second end of the case opposite the first end of the case, and a space between the internally threaded channel and the aperture, a cannulated screw threadedly engaged with the internally threaded channel and having a head with an external diameter greater than a diameter of the internally threaded channel, the cannulation of the screw being aligned with the aperture, and an annular gasket trapped within the space, the gasket having a central opening aligned with the cannulation of the screw and the aperture such that the cannulation of the screw, the central opening, and the aperture collectively define a lumen extending through the grip.

Also disclosed is a method of loading a prosthetic valve into a delivery system, and the method may comprise assembling a loading tube over a distal sheath and an outer shaft of the delivery system, the loading tube having a lumen with an internal diameter, tightening a grip on the outer shaft at a location corresponding to an intended limit of proximal travel for the loading tube along the outer shaft, the grip having an external diameter greater than the internal diameter of the loading tube, applying tension to an inner shaft extending within the outer shaft and the sheath and connected to the prosthetic valve while the prosthetic valve is disposed at a distal end of the loading tube; and/or tightening the grip may cause a narrow end of the grip to enter the lumen of the loading tube; and/or tightening the grip may include turning a first component of the grip relative to a second component of the grip about a loading axis along which the outer shaft extends.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A valve loading system, comprising:
a delivery device for a prosthetic valve, the delivery device including an outer shaft and a distal sheath connected to the outer shaft, the distal sheath being sized to receive the prosthetic valve in a collapsed condition;
a loading tube sized to receive the prosthetic valve, the loading tube having a proximal end defining a proximal opening having a proximal opening diameter; and
a grip adjacent the proximal end of the loading tube, the grip comprising:
a body having an external diameter greater than the proximal opening diameter and a body lumen extending therethrough, the body lumen having a diameter, an axis extending in a longitudinal direction, and an inner annular surface oriented at an acute angle to the longitudinal direction; and
a deformable member positioned in the body, the deformable member having a deformable lumen with an axis that is colinear with the axis of the body lumen, an undeformed diameter sized to receive the outer shaft therethrough, a first surface facing the inner annular surface of the body lumen and oriented at an oblique angle to the longitudinal direction, and a second surface opposite the first surface and oriented substantially orthogonal to the longitudinal direction, the deformable member being compressible in the longitudinal direction against the inner annular surface of the body to reduce the diameter of the deformable lumen, whereby the deformable member exerts a force on the outer shaft that limits movement of the loading tube relative to the outer shaft.

2. The valve loading system of claim 1, wherein the body is integrally connected to the loading tube for receiving the prosthetic valve.

3. The valve loading system of claim 1, further comprising a fitting that is movable relative to the body along a loading axis, and the diameter of the deformable lumen changes in response to movement of the fitting within a range of positions relative to the body.

4. The valve loading system of claim 1, wherein the body includes a first component and a second component, the first component is movable relative to the second component in the longitudinal direction, and the diameter of the deformable lumen changes in response to movement of the first component within a range of positions relative to the second component.

5. The valve loading system of claim 4, wherein the deformable member is an annular gasket defining the deformable lumen, the gasket being disposed between opposed surfaces of the first component and the second component such that movement of the first component within the range of positions varies compression of the gasket in the longitudinal direction.

6. The valve loading system of claim 5, wherein the first component is a fitting, the second component is a case within which the fitting and the gasket are disposed, and the gasket is trapped within a space between the opposed surfaces of the first component and the second component.

7. The valve loading system of claim 4, wherein the first component is a screw threadedly engaged with the second component.

8. The valve loading system of claim 4, wherein the second component is a case, and a portion of the first component extends out of the case.

9. A valve loading system, comprising:
a delivery device for a prosthetic valve, the delivery device including an outer shaft and a distal sheath connected to the outer shaft, the distal sheath being sized to receive the prosthetic valve in a collapsed condition;
a loading tube sized to receive the prosthetic valve, the loading tube having a proximal end defining a proximal opening having a proximal opening diameter; and
a releasable grip adjacent the proximal end of the loading tube, the grip including:
a case having an external diameter greater than the proximal opening diameter, the case being axially aligned with the loading tube and defining an internally threaded channel extending from a first end of the case, an aperture at a second end of the case opposite the first end of the case, and a space between the internally threaded channel and the aperture, the case having an axis extending in a longitudinal direction and an inner annular surface oriented at an acute angle to the longitudinal direction;
a cannulated screw threadedly engaged with the internally threaded channel and having a head with an external diameter greater than a diameter of the internally threaded channel, the cannulation of the screw being aligned with the aperture; and
an annular gasket trapped within the space, the gasket having a deformable central opening aligned with the cannulation of the screw and the aperture such that the cannulation of the screw, the central opening, and the aperture collectively define a lumen extending in the longitudinal direction through the grip, the central opening of the gasket having an undeformed diameter sized to receive the outer shaft therethrough, the gasket having a first surface facing the inner annular surface of the case and oriented at an oblique angle to the longitudinal direction, and a second surface opposite the first surface and oriented substantially orthogonal to the longitudinal direction, the gasket being compressible in the longitudinal direction against the inner annular surface of the case to reduce the diameter of the central opening, whereby the gasket exerts a force on the outer shaft that limits movement of the loading tube relative to the outer shaft.

10. A method of loading a prosthetic valve into a delivery system, the method comprising:
assembling a loading tube over a distal sheath and an outer shaft of the delivery system, the loading tube having a lumen with an internal diameter;
tightening a grip on the outer shaft to fix the grip relative to the outer shaft at a location proximal of the loading tube and corresponding to an intended limit of proximal travel for the loading tube along the outer shaft, at least a portion of the grip having an external diameter greater than the internal diameter of the loading tube; and
applying tension in a proximal direction to an inner shaft extending within the outer shaft and the distal sheath and connected to the prosthetic valve while the prosthetic valve is disposed at a distal end of the loading tube, whereby the grip inhibits movement of the loading tube in the proximal direction relative to the outer shaft and the prosthetic valve is pulled proximally into the distal sheath.

11. The method of claim 10, wherein tightening the grip includes turning a first component of the grip relative to a second component of the grip about a loading axis along which the outer shaft extends.

* * * * *